United States Patent Office 3,606,296
Patented Sept. 20, 1971

3,606,296
APPARATUS FOR ABSORBING SHOCKS AND VIBRATIONS
Pierre Chassagne, Chamalieres, France (% Fort Dunlop, Erdington, Birmingham 24, England)
Filed Feb. 24, 1969, Ser. No. 801,493
Claims priority, application France, Mar. 5, 1968,
22,186
Int. Cl. F16f 9/10
U.S. Cl. 267—113                7 Claims

ABSTRACT OF THE DISCLOSURE

An anti-vibration mounting comprising a rubber sleeve sealed at each end and divided internally into one compartment vented to the atmosphere and a second compartment filled with a liquid, the sleeve being shaped so that the side walls buckle radially inwardly when compressed axially.

---

This application is a continuation-in-part of copending application Ser. No. 794,063 filed Jan. 27, 1969.

This invention relates to shock and vibration damping devices of the kind used, for example, as anti-vibration machine mountings.

One object of the invention is to provide an improved antivibration mounting.

According to the invention a shock and vibration damping device comprises an annular element of resilient material confined between rigid end pieces at its axially outer ends, the inner periphery of the element defining an axially extending space sealed at each end by the said end pieces, a partition being attached to the inner periphery of the element and arranged to divide the space into a first compartment and a second compartment, the first compartment being filled with a fluid. The term "fluid" as used in this specification should be construed as referring only to a substance in a liquid, viscous or plastic state which is fluidly deformable but substantially incompressible.

One embodiment of the invention will now be described by way of example with reference to the accompanying drawings, in which.

Figure 1:
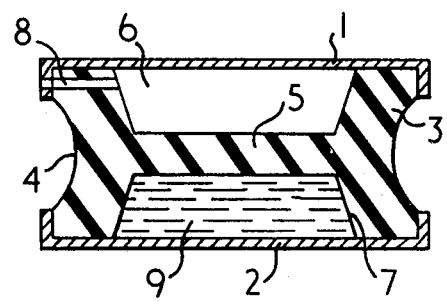
FIG. 1 is an axial cross-sectional view of a shock and vibration damping device in the unloaded state.

The mounting shown in FIG. 1 comprises a pair of disc-shaped rigid metal end pieces 1, 2 having, respectively, circumferentially axially-extending lips which serve to trap a hollow cylindrical rubber element 3 between the end pieces 1, 2. The external surface 4 of the element 3 is slightly concave and the inner surface of the element 3 slightly convex so that the central portion of the element projects radially inwardly.

A flexible rubber partition 5 is formed integrally with the element 3 at the central portion of the element 3. The inner surface of the element 3 defines an axially extending space sealed at each end by the end pieces 1, 2 and divided into two compartments 6, 7 by the partition 5.

One compartment 7 is completely filled with a liquid 9 and the other compartment 6 is open to the atmosphere through a vent passage 8 formed in the element 3.

Figure 2:
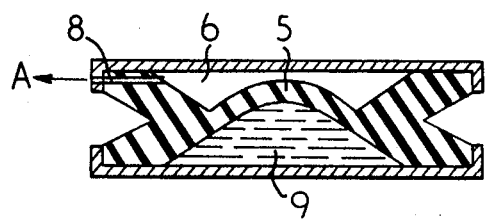
FIG. 2 is a similar view showing the device in the loaded state.

When the element 3 is compressed axially by means of an applied load as seen in FIG. 2 the arched configuration of the element causes the central portion of the element to move radially inwardly. Since the liquid 9 in the compartment 7 is incompressible the partition 5 is deflected in an axial direction into the compartment 6. Air is displaced from the compartment 6 to the atmosphere through the passage 8 as indicated by the arrow A.

The element 3 is formed from resilient material and thus tends to return to its initial state after the applied load is removed.

In addition to the damping effect of the element 3 the two compartments 6, 7 act respectively as pneumatic and hydraulic dampers.

The damping device described above is thus capable of absorbing both resonant and mechanical vibrations and the shock waves of all these vibrations are absorbed in an omni-directional way.

The damping device described above can be used on any vibrating appliance for industrial and scientific applications and in all applications where it is required to damp vibration.

The shapes, sizes and configurations of the component elements and their material may be varied according to specific circumstances and equivalent means may be employed without thereby changing the general concept of the invention.

Having now described my invention, what I claim is:
1. A shock and vibration damping device comprising an annular element of resilient material confined between rigid end pieces at its axially outer ends, the inner periphery of the element defining an axially extending space sealed at each end by the said end pieces, a radial elastic imperforate partition being attached to the inner periphery of the annular element and arranged to divide the space into a first compartment and a second compartment axially spaced from each other and each filled with different fluid, the first compartment being closed and filled with a liquid fluid.
2. A shock and vibration damping device according to claim 1 wherein the partition is formed integrally with the annular element.
3. A shock and vibration damping device according to claim 1 wherein the inner edge of the annular element is shaped so as to provide a radially inwardly arched configuration, considered in axial cross-section.
4. A shock and vibration damping device according to claim 3 wherein the annular element is in the form of a hollow cylinder having an outer edge which in external profile curves radially inwardly from the end portions towards the central portion thereof.
5. A shock and vibration damping device according to claim 4 wherein the rigid end pieces are of disc-shaped metallic form each having a circumferential axially-extending lip to trap the corresponding end of the annular element.
6. A shock and vibration damping device according to claim 1 wherein the second chamber contains only air and is vented to the atmosphere.
7. A shock and vibration damping device according to claim 6 wherein a vent passage is provided in the annular element to provide communication between the second chamber and the atmosphere.

References Cited

UNITED STATES PATENTS 3,159,249   12/1964   Lazan _____ 267—63

FOREIGN PATENTS 620,144    3/1949   Great Britain _____ 267—141

JAMES B. MARBERT, Primary Examiner